Patented Jan. 20, 1942

2,270,780

UNITED STATES PATENT OFFICE 2,270,780

PROCESS FOR THE OXIDATION OF ETHYLENE

Ernst Berl, Pittsburgh, Pa., assignor to Berl Chemical Corporation, a corporation of Delaware No Drawing. Application February 7, 1938, Serial No. 189,278. In Great Britain February 25, 1937

2 Claims. (Cl. 260—348)

This invention relates to the production of olefine oxides by oxidation of the corresponding olefines and particularly but not exclusively to the production of ethylene oxide and propylene oxide from ethylene and propylene respectively.

A number of methods have been proposed for the controlled oxidation of olefines whereby the corresponding olefine oxides are obtained without substantial amounts of by-products other than carbon dioxide which is invariably formed in all such processes as one of the products of reaction. It has been proposed for example to effect the reaction in reaction vessels having a large free space in relation to surface and it is also known to use catalysts particularly silver catalysts in various forms, for example on carriers or in a finely divided state of division or as a thin layer on the walls of the catalyst chamber, with or without the addition of promoters, as a means of directing the oxidation of olefines towards the formation of the corresponding oxides.

In all processes for the direct oxidation of olefines to olefine oxides, two types of reaction occur. Taking ethylene as an illustration these may be expressed as follows:

(1) 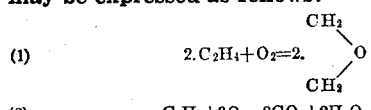

(2) $C_2H_4 + 3O_2 = 2CO_2 + 2H_2O$

Both of the above reactions are exothermic and the heat evolved in Reaction 2 is considerably greater than that evolved in reaction 1; consequently there is a tendency in the oxidation of olefines for the reaction to proceed too far so that the final products of combustion, namely carbon dioxide and water, are obtained. It has been proposed to counteract this tendency towards over oxidation by diluting the reacting gases with inert gases such as steam, nitrogen, and carbon dioxide, but in order to produce satisfactory results relatively large amounts of such diluents have to be employed. Means have also been proposed for removing or dissipating the heat evolved in the reaction.

According to the present invention the direct oxidation of olefines, particularly ethylene and propylene, by means of oxygen or gases containing oxygen to form the corresponding olefine oxides is carried out in the presence of small amounts of substances known as "anti-knock" materials, i. e. substances known to confer anti-detonating properties on fuels used in internal combustion engines.

The reaction may be effected with or without a catalyst, but preferably a silver catalyst with or without promoters is employed. The oxidation is carried out at temperatures known to be favourable for the production of olefine oxides, e. g. 150°–400° C. and may be effected under atmospheric pressure. Increased pressure or reduced pressure may, however, be employed.

Numerous compounds are known to possess anti-knock properties and their efficacy varies with the nature of the compound. Some, for example organic-metallic compounds, such as tetra-ethyl lead, or halogenated hydrocarbons such as ethylene dibromide, produce the desired result when added in very small amounts, whereas with others, for example aromatic hydrocarbons such as benzene or aliphatic alcohols such as ethyl alcohol, it is necessary when using them as anti-knock material in motor fuels to add relatively large amounts to the fuel to produce the same effect. It has now been found that for the specific purpose of controlling the oxidation of olefines the latter class of compounds is effective in small amounts although it is sometimes desirable to employ somewhat greater quantities than those found to be suitable with the more highly active anti-detonants.

Any amount of the anti-detonating substance not exceeding about 0.5% of the total volume of reactants may be employed but preferably the amount added is from 0.005% to 0.2%. The amount added may as hereinbefore stated depend to some extent on the activity of the anti-detonant employed, and, as will be readily understood by those skilled in the art, will depend on whether the oxidation is effected in the presence or absence of a catalyst and on the activity of the catalyst, if such be employed.

The following substances have been found particularly suitable for carrying out the process of the present invention viz. aromatic hydrocarbons such as benzene or xylene, aliphatic alcohols such as ethyl alcohol, halogenated hydrocarbons e. g. ethylene dibromide or ethylene dichloride, halogens such as iodine, aromatic amines such as aniline, and organo metallic compounds such as tetra-ethyl lead.

It will be understood that if a catalyst is employed the anti-detonating substance added should be so selected as not to poison or destroy the activity of the catalyst; for instance in the case of using a silver catalyst the use of an organo metallic compound such as tetra-ethyl lead may be undesirable.

The following two examples illustrate the practising of the invention.

Example 1

Ethylene in admixture with air or oxygen was carefully oxidised under conditions known to be suitable for production of ethylene oxide, no catalyst being used but a small amount of tetra-ethyl lead representing about 0.01 per cent of the reactants being added thereto. A very good yield of ethylene oxide was obtained.

Example 2

To a gaseous mixture of ethylene and air in the volume ratio of 5 to 95, a quantity of ethylene dibromide equal to 0.05 per cent of the mixture was added. This mixture was then passed through a tube coated with silver and maintained at a temperature of 350° C. 85 per cent of the ethylene was used up, and 65 per cent was converted into ethylene oxide.

In place of the ethylene dibromide specified in Example 2, it is possible to use 0.1% of ethylene dichloride or benzene or xylene or aniline, or 0.2% of a lower aliphatic alcohol such as ethyl alcohol.

What I claim is:

1. The process of directly oxidizing ethylene to ethylene oxide which comprises partially oxidizing ethylene with gaseous oxygen in the presence of tetra-ethyl lead in an amount of less than .5% by volume of the reactants.

2. The process of directly oxidizing ethylene to ethylene oxide which comprises partially oxidizing ethylene with gaseous oxygen in the presence of tetra-ethyl lead in an amount of about .01% by volume of the reactants.

ERNST BERL.